2,879,261
CHLOROSULFONATED HYDROCARBON COPOLYMERS

Paul R. Johnson and Malcolm A. Smook, Wilmington, Del., assignors to E. I. du Pont de Nemours and Company, Wilmington, Del., a corporation of Delaware No Drawing. Application August 18, 1955
Serial No. 529,359

3 Claims. (Cl. 260—79.3)

This invention relates to high polymers containing chemically reactive groups, and more particularly to polymers which result from the copolymers of low molecular weight monoolefins of the aliphatic series into which reactive groups are introduced by chlorosulfonation.

It is known that solid polyethylenes may be converted into curable elastomers by a chlorosulfonation reaction in which from 25% to 37% of chlorine is introduced into the molecule and from 0.4% to 3.0% of sulfur, the sulfur being present in the grouping $-SO_2Cl$. These products have many physical properties of uncured natural rubber for they can be milled, compounded with suitable ingredients and molded and can be cured with special curing agents to convert the plastic product into elastic articles. While having the physical properties of rubber to a large extent, these elastomers are exceptionally light in color and are greatly superior to rubber in resistance to the action of oxygen and ozone and to chemical action in general. On the other hand, they are deficient in tack in the uncured state, thus increasing the difficulty of building up composite articles such as tires.

While copolymers of ethylene and propylene have been made with the use of Friedel-Crafts catalysts, they were of relatively low molecular weight and therefore were liquids or, at most, viscous greases.

It is an object of the present invention to produce curable chlorinated elastomers having improved physical properties, from copolymers of low molecular weight monoolefins, which have good tack in the uncured state and are capable of being built into composite articles. It is a further object of the invention to produce chlorosulfonated copolymers of low molecular weight monoolefins, which copolymers in the unchlorosulfonated state are normally solid and of relatively high molecular weight. It is a still further object of the invention to produce chlorosulfonated copolymers of two or more terminally unsaturated monoolefins containing from 5% to about 35% of chlorine and from 0.5% to about 3.0% of sulfur, in which the monoolefins employed contain not more than six carbon atoms and no one of the olefins is present in the copolymer to an extent greater than 60 mol percent.

The copolymers of the present invention are prepared by the copolymerization of aliphatic monoolefins containing up to six carbon atoms in the molecule using a catalyst normally used in coordination polymerization, preferably one that contains titanium with a valence of less than 4. Such catalysts are conveniently made by the reaction of a lithium aluminum alkyl with titanium tetrachloride in a hydrocarbon solvent which may also serve as a solvent in carrying out the polymerization of the olefins. The polymerization may take place at ordinary temperatures and pressures. It is usually convenient to allow the temperature to rise spontaneously to 50° or 60° C. The rate of reaction may be increased by increasing the concentration of the monomer by pressure or increasing the temperature, or both.

The monomers are usually added simultaneously to the catalyst solution over a period of several hours and in the ratio in which they are desired in the copolymer, although under the conditions of the polymerization if one monomer is found to polymerize more slowly than the others all of it may be added at the beginning or it may be added at a faster rate than the others.

The following examples are given to illustrate the general method for preparing the catalysts, the copolymers and the sulfonation of the copolymers. Unless otherwise specified, the parts and percentages used are by weight.

EXAMPLE 1

A mixture of ethylene, propylene and butene-1 was polymerized, using a catalyst made as follows: Lithium aluminum hydride, 3.05 grams (0.08 mol) and 56 grams (0.4 mol) of decene-1 were heated at 140° to 160° C. for three hours in strict absence of water and oxygen. The reaction product was then cooled and taken up in 3 liters of benzene and reacted with 4.9 grams (0.026 mol) of titanium tetrachloride. A fine black suspension of the catalyst in benzene resulted. Still working in absence of water and oxygen, a mixture of 38% ethylene, 57% propylene and 5% butene-1 by weight (corresponding to 16 mols of each of the first two per mol of butene-1) was passed at 25° C. and slightly more than atmospheric pressure into this benzene suspension. Absorption was complete. The temperature rose spontaneously to 50° C. The solution gradually became viscous. When 200 grams of the gas mixture had been absorbed, the polymer was isolated by pouring the benzene solution into methanol containing hydrogen chloride and drying the precipitate by milling on a rubber mill. 180 g. of polymer was obtained. The polymer was very light in color, had good tack, and formed a smooth band on the mill.

While this illustration discloses the copolymerization of three olefins, the same general procedure is employed in making the copolymerization of two or more olefins.

The copolymers of the monoolefins prepared as illustrated above are of relatively high molecular weight and are normally solid products which on chlorosulfonation give elastomers having improved working properties over the chlorosulfonation products of lower molecular weight.

The chlorosulfonation of the polymers is conveniently carried out in an inert solvent such as carbon tetrachloride, by first adding chlorine and then a mixture of chlorine and sulfur dioxide. A free radical catalyst, or, more properly speaking, a reaction initiator, may be used as more particularly described in U.S. Patent 2,503,252 and U.S. Patent 2,503,253. The chlorosulfonated products may be isolated by removing the carbon tetrachloride or other solvent by steam distillation or by evaporation on a drum drier in which the dried film can be removed from the drum as a self-supporting, continuous film suitable for further processing. Suitable stabilizers for the product are epoxy compounds such as the condensation products of epichlorhydrin with diphenols. These polymers may be cured by compounding with metal oxides or weak acid salts of divalent metals such as lead and magnesium, as more particularly described in U.S. Patents 2,416,060 and 2,416,061, or with certain diamines such as benzidine, and heating under conditions similar to those used in the vulcanization of natural rubber. Ordinary rubber vulcanization accelerators may be used as accelerators in the vulcanization of the products of the present invention. Pigments, fillers, reenforcing agents and other compounding ingredients normally used in natural rubber may be used in these polymers.

The copolymers of this invention are curable, rubber-like elastomers which may be used wherever an elastomer which is particularly resistant to oxygen, ozone, heat and light is required, such as for jacketing for wire and cable, industrial rolls, tank linings for corrosive chemicals, mechanical goods of all kinds, which may be prepared in the form of films, molded articles, or by extrusion.

The copolymers of the present invention should contain from 5% to 35% of chlorine and from 0.5% to about 3.0% of sulfur. The invention contemplates the preparation of copolymers containing two or more olefins, no one olefin being present as a component of the copolymer in an amount greater than 60 mol percent. A preferred product coming within the scope of this invention contains from 3 to 20 mol percent of an olefin containing 4 to 6 carbon atoms, with the rest of the polymer comprising ethylene and propylene as the other components.

In the tables a number of chlorosulfonated copolymers of this invention are listed, their chlorine and sulfur content and physical properties being given. The polymers employed were prepared as more particularly described above, using the specific ratio of monoolefins given in the table. The following procedure, which is suitable for chlorosulfonating olefin copolymers of this invention, was used in producing the products listed in the tables.

Thirty (30) grams of the polymer was dissolved in 1200 cc. of $CCl_4$ by heating under reflux. Any water present was separated from the reflux. A small amount (.059 g.) of the azo initiator, alpha,alpha'-azodiisobutyronitrile, was added and the system was flushed with nitrogen to remove air, and heated to reflux. A small stream of chlorine was introduced into the refluxing solution, with agitation. When the reaction started, as evidenced by copious HCl evolution, the heating of the flask was stopped and the chlorine feed was increased to 4.6 gm./hr. The flask was allowed to cool slowly to 52° C. during the first hour of chlorine addition. Chlorine was added at the above rate until the desired quantity of chlorine was introduced, assuming that 90% of the chlorine reacts. At the end of this time, $SO_2$ addition was started at 11.8 gm./hr. along with chlorine as before, and this chlorosulfonation was continued at 52° C. until it had taken place to the desired extent, assuming that 30% of the $SO_2$ is utilized. The solution was then refluxed for one-half to one hour, cooled to 60° C., and stabilized by the addition with stirring of 0.1 g. of the condensation product of 2 mols of epichlorhydrin with 1 mol of propane-2,2-bisphenol. The polymer was isolated by drum drying, using a double-roll steam-heated drier, with each roll 8 inches wide and 6 inches in diameter with the carbon tetrachloride solution introduced between the rolls and the dried film of chlorosulfonated polymer removed from the rolls by doctor knives. Using steam at about 30 pounds pressure (135° C.) and two revolutions per minute, the above charge was introduced over a period of about 18 minutes. The thin, continuous, self-supporting dried films removed by the doctor knives were wound up on reels, forming compact, laminated masses for testing. The dried films may also be laterally compressed into a continuous, compact rope.

For physical testing, each chlorosulfonate copolymer was compounded on a rubber mill with 40 parts by weight of litharge, 30 parts of carbon black, 2.5 parts of disproportionated rosin and 0.5 part of a mixture of dipentamethylene thiuram tetrasulfide and mercaptobenzothiazole per 100 parts of the elastomer, and cured for thirty minutes at 160° C. The tensile strength, elongation at break and modulus were determined in the usual way and recorded in the tables.

Table I

CHLOROSULFONATED COPOLYMERS FROM 2 MONOOLEFINS

| Olefins | Molar Ratio | Chlorine, percent | Sulfur, percent | Tack | Tensile |
| --- | --- | --- | --- | --- | --- |
| Ethylene+propylene | 1:1 | 17.7 | 0.6 | Good | 3,050 |
| Do | 3:2 | 13.0 | 1.3 | Slight | 3,400 |
| Do | 2:3 | 14.5 | 0.7 | do | 2,420 |
| Do | 1:1 | 15.6 | 3.0 | Fair | 3,250 |
| Ethylene+butene-1 | 1:1 | 9.7 | 1.0 | do | 2,900 |
| Propylene+butene-1 | 1:1 | 11.7 | 1.1 | do | 3,050 |
| Ethylene+hexene-1 | 1:1 | 11.7 | 1.0 | Good | 2,050 |

Table II

CHLOROSULFONATED COPOLYMERS OF ETHYLENE-PROPYLENE-BUTENE-1 COPOLYMERIZED IN THE MOLAR RATIOS AS GIVEN

| Molar Ratio | Chlorine, percent | Sulfur, percent | Properties at 25° C. | | |
| --- | --- | --- | --- | --- | --- |
| | | | Tensile at Break, Lbs./sq. in. | Elongation at Break, percent | Modulus 100% Elongation, Lbs./sq. in. |
| 8:8:1 | 33.5 | 0.6 | 3,210 | 275 | 1,225 |
| 8:8:1 | 26.3 | 0.8 | 3,800 | 290 | 1,000 |
| 8:8:1 | 30.0 | 1.5 | 3,750 | 220 | 1,400 |
| 8:8:1 | 26.0 | 1.1 | 3,090 | 225 | 1,100 |
| 8:8:1 | 7.0 | 0.8 | 3,300 | 480 | [1] 1,650 |
| 8:8:1 | 12.9 | 2.4 | 2,900 | 225 | 1,100 |

[1] Modulus at 300% elongation.

Where one of the components is present in the polymer in an amount greater than 60 mol percent, the tack is much less and the tensile strength is usually poorer. The tack of the copolymers of this invention is much superior to the tack of the chlorosulfonated polyethylene now on the market, and in most cases has increased tensile strength. The chlorosulfonated homopolymers of the higher olefins ($C_3$ to $C_6$) have been found to have much poorer tensile strength than the polyethylene product, although they do have improved tack.

It should be understood that many variations may be made in the particular copolymer by altering the amount of the monomers within the range given above. In general, the chlorosulfonation of these polymers may be carried out in the same manner as the sulfonation of polyethylene described in the prior art. Where the copolymer does not give excessively viscous solutions, the amount of carbon tetrachloride may be materially reduced since it is only necessary that the solution be thin enough to stir readily during the addition of the chlorine and sulfur dioxide.

What is claimed is:

1. Curable elastomeric chlorosulfonated copolymers of at least two monoolefins, each being terminally unsaturated and containing not more than 6 carbon atoms, at least one containing not more than 3 carbon atoms and being present to the extent of at least 40 mol percent, each monoolefin being present as a component of the polymer to an extent not greater than 60 mol percent, said copolymers prior to chlorosulfonation being normally solid and of high molecular weight, and in the chlorosulfonated state containing from 5% to about 35% of chlorine and from 0.5% to about 3.0% of sulfur, said copolymers having been prepared by polymerization in the presence of a coordination polymerization catalyst prepared by the reaction of a lithium aluminum alkyl with titanium tetrachloride in a hydrocarbon solvent.

2. A curable elastomeric chlorosulfonated copolymer consisting of ethylene and propylene, the said copolymer prior to chlorosulfonation being normally solid and of high molecular weight, and in the chlorosulfonated state containing from 5% to 15% of chlorine and from 0.5% to about 3.0% of sulfur, neither of the components of the copolymer being present in an amount greater than 60 mol percent, said copolymer having been prepared by polymerization in the presence of a coordination polymerization catalyst prepared by the reaction of a lithium aluminum alkyl with titanium tetrachloride in a hydrocarbon solvent.

3. A curable elastomeric chlorosulfonated copolymer consisting of ethylene, propylene and a monoolefin which is terminally unsaturated and contains from 4 to 6 carbon atoms, the said monoolefin being present in the copolymer in an amount from 3 to 20 mol percent, and no component of the copolymer being present in an amount greater than 60 mol percent, said copolymer prior to chlorosulfonation being normally solid and of high molecular weight, and in the chlorosulfonated state containing from 5% to about 35% of chlorine and from 0.5% to about 3.0% of sulfur, said copolymer having been prepared by polymerization in the presence of a coordination polymerization catalyst prepared by the reaction of a lithium aluminum alkyl with titanium tetrachloride in a hydrocarbon solvent.

References Cited in the file of this patent

UNITED STATES PATENTS

| 2,212,786 | McQueen | Aug. 27, 1940 |
| 2,726,231 | Field et al. | Dec. 6, 1955 |

OTHER REFERENCES

C. and E. News, 33, page 2910 (July 11, 1955). Copy in Scientific Library.